United States Patent
Diwan et al.

(10) Patent No.: US 10,452,674 B2
(45) Date of Patent: Oct. 22, 2019

(54) ARTIFICIAL INTELLIGENCE AND ROBOTIC PROCESS AUTOMATION FOR AUTOMATED DATA MANAGEMENT

(71) Applicant: Accenture Global Solutions Limited, Dublin (IE)

(72) Inventors: Gaurav Diwan, Cypress, CA (US); Tracy Ann Goguen, Culver City, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/206,503

(22) Filed: Nov. 30, 2018

(65) Prior Publication Data
US 2019/0180746 A1 Jun. 13, 2019

Related U.S. Application Data

(60) Provisional application No. 62/595,944, filed on Dec. 7, 2017.

(51) Int. Cl.
| | |
|---|---|
| G06F 16/25 | (2019.01) |
| G10L 15/22 | (2006.01) |
| G06F 16/9032 | (2019.01) |
| G06N 20/00 | (2019.01) |
| G06F 17/27 | (2006.01) |
| G10L 15/18 | (2013.01) |
| H04L 29/08 | (2006.01) |

(52) U.S. Cl.
CPC ...... *G06F 16/252* (2019.01); *G06F 16/90332* (2019.01); *G06F 17/2765* (2013.01); *G06N 20/00* (2019.01); *G10L 15/18* (2013.01); *G10L 15/22* (2013.01); *H04L 67/306* (2013.01); *G10L 2015/223* (2013.01)

(58) Field of Classification Search
CPC ........ G10L 15/22; G06N 20/00; G06F 16/252
USPC ...................................................... 704/275
See application file for complete search history.

(56) References Cited

U.S. PATENT DOCUMENTS

| | | | |
|---|---|---|---|
| 9,137,029 B1 * | 9/2015 | Vasquez ................ H04L 12/185 |
| 9,275,632 B1 * | 3/2016 | McCobb ................. G10L 13/00 |
| 9,430,463 B2 | 8/2016 | Futrell et al. |
| 9,589,578 B1 * | 3/2017 | Dippenaar .......... H04L 67/2823 |
| 9,805,718 B2 | 10/2017 | Ayan et al. |
| 9,817,967 B1 * | 11/2017 | Shukla .................... G06F 21/52 |

(Continued)

*Primary Examiner* — Shaun Roberts
(74) *Attorney, Agent, or Firm* — Harrity & Harrity, LLP

(57) ABSTRACT

A device receives, from a virtual assistant device, a first user input associated with a first account of a user, and causes a natural language processing analysis to be performed on the first user input to identify first information, the first account, and a first operation to be performed in association with first information in the first account. The device identifies a first data management platform, associated with the first account, that is configured to maintain the first information in a first data structure associated with the first data management platform, and determines that the first data management platform is a first type of data management platform based on the first data structure. The device causes the first operation to be performed using a RPA, that uses a user interface of the first data management platform, based on the first data management platform being the first type of data management platform.

20 Claims, 7 Drawing Sheets

(56) References Cited

U.S. PATENT DOCUMENTS

| | | | |
|---|---|---|---|
| 9,928,106 B2* | 3/2018 | Hosabettu | G06F 3/0482 |
| 10,120,656 B1* | 11/2018 | Singh | G06F 8/33 |
| 10,121,141 B1* | 11/2018 | Belleville | G06Q 20/3672 |
| 2009/0313684 A1* | 12/2009 | Shah | G06F 21/335 |
| | | | 726/7 |
| 2010/0145861 A1* | 6/2010 | Law | G06Q 20/102 |
| | | | 705/76 |
| 2012/0191575 A1* | 7/2012 | Vilke | G06Q 30/0641 |
| | | | 705/27.1 |
| 2012/0265528 A1* | 10/2012 | Gruber | G10L 15/18 |
| | | | 704/235 |
| 2015/0066479 A1 | 3/2015 | Pasupalak et al. | |
| 2017/0001308 A1* | 1/2017 | Bataller | B25J 9/163 |
| 2017/0052824 A1* | 2/2017 | Sharma | G06Q 10/10 |
| 2017/0173784 A1* | 6/2017 | Shah | B25J 9/0084 |
| 2017/0357480 A1* | 12/2017 | La Placa | G06N 5/02 |
| 2018/0053007 A1* | 2/2018 | Alexander | H04L 63/102 |

* cited by examiner

ARTIFICIAL INTELLIGENCE AND ROBOTIC PROCESS AUTOMATION FOR AUTOMATED DATA MANAGEMENT

RELATED APPLICATION

This application claims priority under 35 U.S.C. § 119 to U.S. Provisional Patent Application No. 62/595,944, filed on Dec. 7, 2017, the content of which is incorporated by reference herein in its entirety.

BACKGROUND

Data structures, such as databases, data tables, data indexes, graphs, and/or the like may be sorted and/or organized to hold any type of data. The data can represent and/or be used to indicate information via text, images, audio, video, etc. The data structure may be sorted and/or organized by a particular topic. For example, to manage information associated with an individual, an entity might maintain a data structure that includes an account associated with the individual. In such cases, the entity and/or individual may access the data structure to update information associated with the plurality of individuals.

SUMMARY

According to some implementations, a method may include receiving a user input, wherein the user input is received via a communication with a user, wherein the user input is received from a virtual assistant device, and wherein the communication is associated with an account of the user. The method may include causing a natural language processing model to analyze the user input, wherein the natural language processing model is configured to identify, from the user input, an operation associated with the account. The method may include identifying the operation that is to be performed, wherein the operation is performed according to the user input, and wherein the operation is performed in association with the account. The method may include identifying a data management platform associated with the account, and determining whether the operation can be performed using an application programming interface (API) associated with the data management platform. The method may include selectively causing the operation to be performed on the data management platform using an API call or a robotic process automation (RPA) that uses a user interface associated with the data management platform, wherein the operation is to be performed using the API call when the operation is capable of being performed using an API associated with the data management platform, and wherein the operation is to be performed using the RPA when the operation is not capable of being performed using an API associated with the data management platform.

According to some implementations, a device may include one or more memories, and one or more processors, communicatively coupled to the one or more memories, to receive, from a virtual assistant device, a first user input associated with a first account of a user. The one or more processors may cause a natural language processing analysis to be performed on the user input to identify: a first operation, first information, and the first account of the user, wherein the first operation is to be performed in association with first information in the first account. The one or more processors may identify a first data management platform associated with the first account, wherein the first data management platform is configured to maintain the first information in a first data structure associated with the first data management platform, and may determine that the first data management platform is a first type of data management platform based on the first data structure. The one or more processors may cause the first operation to be performed using a robotic process automation (RPA) based on the first data management platform being the first type of data management platform, wherein the RPA uses a user interface of the first data management platform.

According to some implementations, a non-transitory computer-readable medium may store instructions that include one or more instructions that, when executed by one or more processors of a device, cause the one or more processors to monitor, in real time, a communication associated with updating an account of a user, wherein the communication is between a virtual assistant device of the user and a service platform. The one or more instructions may cause the one or more processors to cause a natural language processing model to analyze the communication, and to obtain, from the natural language processing model, an indication that an operation is to be performed to update information in the account of the user, wherein the user requested the operation and identified the information during the communication. The one or more instructions may cause the one or more processors to determine that the account is associated with a first data management platform of a plurality of data management platforms, and to determine a configuration of the first data management platform. The one or more instructions may cause the one or more processors to perform, in real time, an action associated with the operation, wherein the action is performed, based on the configuration of the first data management platform, using at least one of: an application programming interface (API) call, or a robotic process automation (RPA) that uses a user interface of the first data management platform.

DETAILED DESCRIPTION

Figure 1:
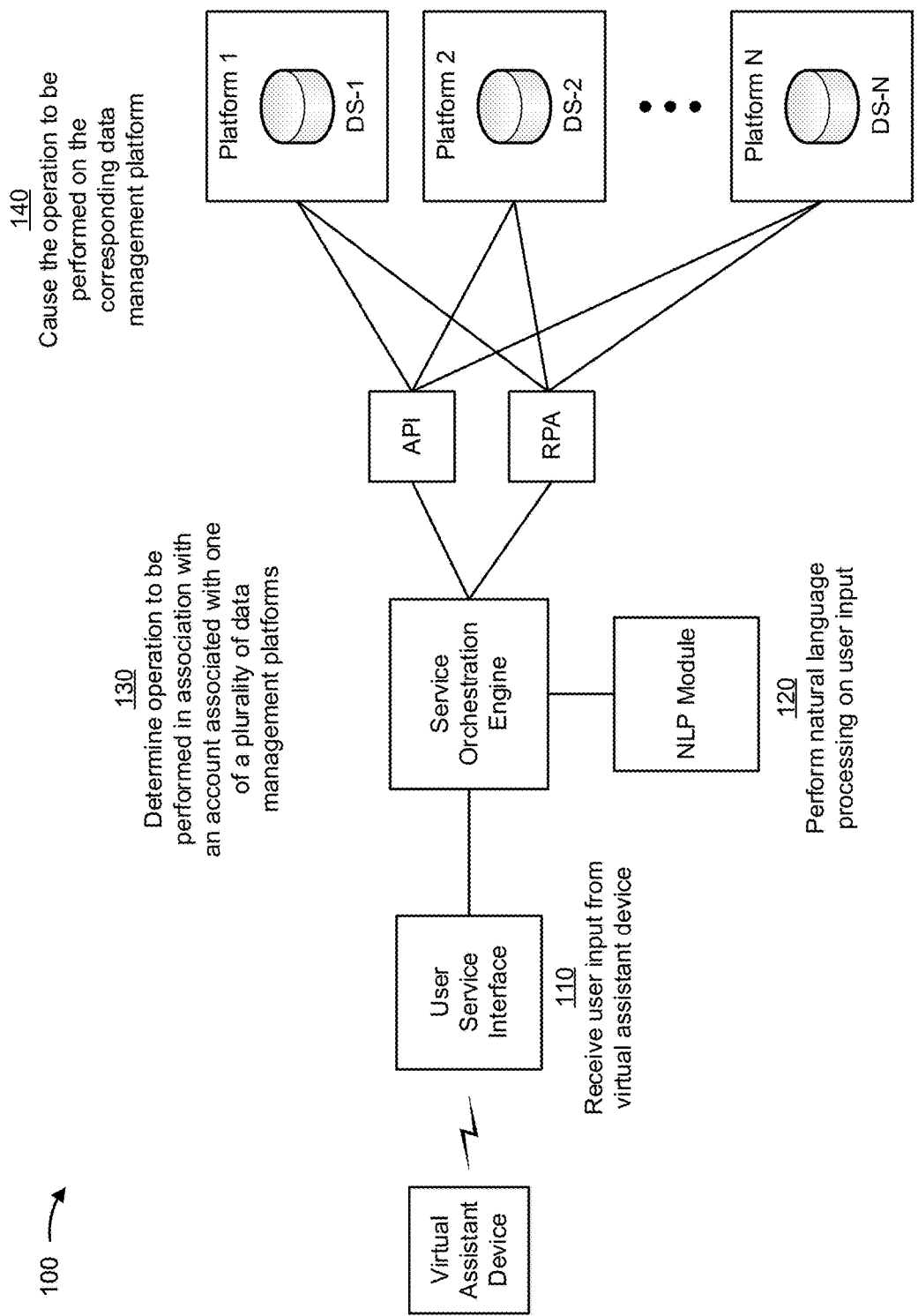
FIG. 1 is a diagram of an example implementation described herein.

The following detailed description of example implementations refers to the accompanying drawings. The same reference numbers in different drawings may identify the same or similar elements.

In some instances, a user may use a user device (e.g., a virtual assistant device) to update information (e.g., information associated with an account of the user) that is managed by a data management platform. In such cases, the user may perform a voice call to the data management platform and/or provide a user input (e.g., a chat message through a chat interface) via the user device to update the information. In some cases, the user may interact with a chat bot associated with the data management platform and/or a conversation service (e.g., speech-to-text, text-to-speech, and/or the like) associated with the data management platform to perform the operation and/or cause an operation to be performed (e.g., in addition to or as an alternative to interacting with a human agent associated with the data management platform). Furthermore, in some instances, automated processes may be performed to update the information associated with the data management platform. Such automated processes can involve updating the information via an application programming interface (API) associated with the data management platform. For example, when the data management platform receives the user input, an automated process may determine that the information is to be updated and use a backend service (e.g., a web-based service, an API or API call, and/or the like) associated with the data management platform to update the information. However, in many instances, a backend service used to update information (or perform other operations) associated with the data management platform becomes outdated, obsolete, and/or inaccessible (e.g., due to errors, failures, and/or shutdowns associated with the backend services). Therefore, the automated processes (or even human agents) cannot update the user information (or perform other operations) via the backend service. Furthermore, in some instances, if the user device is not associated with the data management platform (e.g., managed, operated, and/or maintained by a same entity) and/or is incompatible with the data management platform (e.g., the user device cannot communicate with the data management platform), the user device may not have access to the backend service, associated with the data management platform, to perform the operation.

According to some implementations, described herein, a service orchestration engine (SOE) (e.g., of a virtual assistant platform) enables a user to perform an operation involving data of a data management platform regardless of whether a backend service is available for the data management platform. The SOE may use artificial intelligence (e.g., machine learning, deep learning, and/or the like), a user service interface (e.g., including a call center bot, a chat bot, a conversation service (e.g., a natural language processing technique), and/or the like), and/or a robotic process automation (RPA) to perform an operation, as described herein. For example, the SOE may identify an operation that is to be performed, identify an account associated with the operation, determine a data management platform associated with the account, and perform the operation (or cause the operation to be performed) in association with characteristics of the operation, the account, and/or the data management platform. For example, the SOE may determine whether an operation associated with an account can be performed via a backend service (e.g., a web-based service, an API or API call, and/or the like) associated with a data management platform, and cause the operation to be performed using the backend service if the backend service is available. Additionally, or alternatively, the SOE may cause the operation to be performed using a frontend service (e.g., a user interface, an application, and/or the like) (e.g., via an RPA) associated with the data management platform. More specifically, the SOE may configure and/or instruct an RPA to identify elements of a user interface (e.g., of an application) associated with the data management platform to permit the RPA to navigate the user interface to perform the operation. Additionally, or alternatively, the SOE may configure the user service interface to obtain additional and/or supplemental information from the user (e.g., via a chat bot and/or the user device), when necessary, to cause the operation to be performed (e.g., by causing the RPA to perform the operation) via the user interface of the data management platform.

Therefore, in some implementations, described herein, the SOE may cause an operation (and/or cause an operation to be performed) that accesses a user interface of the data management platform (e.g., a user interface of an application associated with the data management platform) to enter received user information as if the information were manually entered by a human agent. For example, the SOE may cause an RPA to navigate through the user interface of the data management platform based on characteristics of the received user information and enter corresponding user information within designated fields of the user interface to perform the operation. Accordingly, once the user information is entered, the data management platform may update a data structure of the data management platform to include the updated information.

In some implementations, the SOE may cause the operation to be performed (e.g., using an RPA) via a user interface and/or application of the data management platform (which may be referred to herein as a frontend of the data management platform) based on a type of the data management platform (e.g., a type of data management platform known to have unavailable backend services and/or inoperable backend services). Accordingly, using some implementations described herein, network resources and/or computing resources may be preserved because unnecessary communications, involving accessing backend services of the data management platform to perform an operation, are avoided. Furthermore, avoiding such communications may prevent loss of the user information as the user information may be dropped due to a failure caused by attempting to use or communicate with an inaccessible backend service. Furthermore, examples herein may increase capacities of human agents that are to perform relatively tedious tasks, such as updating received information from chat bots and/or users, themselves, by freeing up time for the human agents to perform other tasks.

In this way, several different stages of a process for performing an operation associated with one or more data management platforms are automated, which may remove human subjectivity and waste from the process, and which may improve speed and efficiency of the process and conserve computing resources (e.g., processor resources, memory resources, and/or the like). Furthermore, some implementations described herein use a rigorous, computerized process to perform tasks or activities that were not previously performed. For example, previously, there did not exist a technique to analyze a user input to identify an account, identify and/or determine that a data management platform is associated with an account, determine whether the data management platform is accessible via a backend service (e.g., an API) associated with the data management platform, and selectively cause, based on whether the data management platform can be accessed via the backend service, an operation to be performed (e.g., using an API and/or an RPA) using the backend service, when available or operable, or using a frontend service when the backend service is not available or is inoperable.

Accordingly, computing resources associated with a service representative manually performing an operation on a data management platform and/or attempting to perform an operation on a data management platform, as described herein, are conserved. Furthermore, automating the process for performing an operation associated with a data management platform, as described herein, conserves computing resources (e.g., processor resources, memory resources, and/or the like) and/or network resources that would otherwise be wasted by attempting to perform an operation that is previously not possible with the data management platform (e.g., because a backend service is unavailable, outdated, or corrupted, because the data management platform is incompatible with a user device that provided a user input, and/or the like).

FIG. 1 is a diagram of an example implementation 100 described herein. Example implementation 100 of FIG. 1 includes a virtual assistant device, a user service interface, a natural language processing module (shown as NLP module), an SOE, an API, an RPA and one or more data management platforms (shown as "Platform 1" through "Platform N," where N is an integer and N≥1) (referred to collectively as "data management platforms" or individually as "data management platform"). The virtual assistant device may include a user device (e.g., a personal computer, a mobile device (e.g., a smartphone), a tablet computer, a home assistant device, and/or the like) that is capable of communicating with the SOE, as described herein. Accordingly, the virtual assistant device may include any suitable user interface components described herein to permit the user to provide a user input and/or control the virtual assistant device.

The data management platforms, in example implementation 100 of FIG. 1 may include one or more devices capable of managing data stored in respective data structures of the data management platforms. In some implementations, each of the data management platforms may be associated with different entities. For example, the data management platforms may be owned, managed, and/or operated by different organizations that are involved in a business of managing data, involved with providing a service associated with data, and/or the like. In some implementations, the virtual assistant device may be associated with one or more of the data management platforms. For example, the virtual assistant device (and/or a software or application of the virtual assistant device) may be developed, manufactured, owned, managed, and/or operated in association with the one or more data management platforms by a same entity (e.g., an entity that enables interaction with the one or more data management platforms via the virtual assistant device). Additionally, or alternatively, the virtual assistant device may not be associated with one or more of the data management platforms. For example, the virtual assistant device (and/or software associated with the virtual assistant device, such as an application of the virtual assistant device) is developed, manufactured, owned, managed, and/or operated by a different entity from the one or more entities that owns, manages, and/or operates the one or more data management platforms. The data management platforms include one or more data structures (shown as "DS-1" through "DS-N"). Although FIG. 1 shows each data management platform with one data structure, each of the data management platforms may include a plurality of data structures.

In example implementation 100 of FIG. 1, the SOE may coordinate between and/or communicate with a user service interface, a natural language processing module (shown as "NLP module"), the API and/or the RPA. The SOE may utilize the API and/or the RPA to cause an action to be performed on one or more of the data management platforms. The user service interface may include one or more information processing models that are used to process information received from the virtual assistant device and/or provide information to the virtual assistant device. Such information processing models may include one or more call centers (e.g., a platform that can be accessed via a telephone number), chat bots (e.g., that can be accessed via an application, an online portal, and/or the like), voice gateways, APIs (e.g., a geocoding API, a document recognition API, and/or the like), and/or the like. The natural language processing module may be configured to perform a natural language processing analysis and/or may include one or more natural language processing models to analyze information received by the user service interface. Additionally, or alternatively, the natural language processing module may generate natural language that is provided to the virtual assistant device via the user service interface based on information that may be needed from the user to perform a requested operation, as described herein. The SOE, as described herein, may determine whether an operation associated with a user input can be performed using a backend service and/or API and/or is to be performed using a frontend service, such as going through a user interface associated with the data management platform.

As shown in FIG. 1, and by reference number 110, the SOE (e.g., via the user service interface) receives a user input from the virtual assistant device. In some implementations, the user input may be included within or as part of a communication between the virtual assistant device (and/or the user) and the SOE and/or between the virtual assistant device and a data management platform (e.g., a user service interface associated with the data management platform). For example, the communication may involve a communication that is occurring in real time (e.g., a voice call, an instant message exchange (e.g., a communication through a chat interface), a text message exchange, an email exchange, and/or the like). Additionally, or alternatively, the communication may involve a series of communications that occur over a period of time, such as a series of text messages, a series of emails, a series of voicemails, and/or the like. In some implementations, the user service interface may receive voice signals from the virtual assistant device and provide the voice signals to a voice gateway, which processes the voice signals (e.g., to filter the voice signals).

In some implementations, the user input includes a request that an operation be performed in association with an account of a data management platform. The account may be associated with the user and may maintain information associated with the user and/or the user's relationship with an entity of the data management platform. For example, the account may store account information associated with the user. Such account information may include a name, an address, an identification number, a relationship status (e.g., whether the user is married, has children, and/or the like), an occupation status, and/or the like. In some implementations, the user may have one or more accounts (or have access to one or more accounts) associated with one or more of the data management platforms. Accordingly, if a user is to request that an operation to be performed in association with a particular account of a particular data management platform, the user may specify the account and/or the data management platform in a user input and correspondingly, the SOE may be able to identify the account and/or data management platform, as described herein.

To maintain privacy of the user associated with one or more accounts of the data management platforms, the SOE may ensure that the user opts in (e.g., via an affirmative authorization, by providing access information to the data management platform, and/or the like) to a service that enables the SOE to manage data associated with one or more accounts of the one or more data management platforms. Accordingly, the SOE may be configured to abide by any and all applicable laws with respect to maintaining the privacy of the user and/or content of received user inputs and/or content of the data management platforms. In some implementations, the SOE may anonymize and/or encrypt any private information associated with received user information and/or that is stored and/or maintained in the data management platforms, and/or the like. In some implementations, the SOE may have or be configured to have limited access to information stored and/or maintained in the data management platform. For example, the SOE may be configured to only have access to the information in the data management platforms for a threshold time period associated with receiving a user input associated with performing an operation involving one or more of the data management platforms, to only have access to a limited portion of the data stored and/or maintained in the one or more data management platforms, types of information that is stored and/or maintained by the data management platforms, locations of the data in the data management platforms (e.g., particular folders and/or files of the data management platforms), information in the data management platform that is associated with the operation requested by the user, and/or the like.

As described herein, an operation requested in the user input may include any operation associated with the data management platform. For example, the user input may include a request that information, associated with an account, be updated (e.g., add information, remove information, edit information, and/or the like), provide information (e.g., read and/or send information) associated with the account, create the account, remove the account, link the account to another account associated with another data management platform, and/or the like. In some implementations, the user input may request that an operation be performed on a plurality of corresponding accounts of a plurality of the data management platforms. For example, the user may request the SOE to "update my name on Platform 1 and Platform 2," to cause the SOE to update the user's name in the accounts for Platform 1 and Platform 2. As described herein, the SOE may cause the operations to be performed based on the received user input, the type of operation that is to be performed, and one or more characteristics of the data management platform involved in the operation.

In this way, the SOE may receive a user input from the virtual assistant device to permit the SOE to identify a user, an account of the user, a data management platform associated with the account, and/or an operation that is to be performed in association with the account, as described herein.

As further shown in FIG. 1, and by reference number 120, the SOE (e.g., via the natural language processing module) instructs the natural language processing module to perform natural language processing on the user input. The natural language processing module may include and/or have access to any suitable natural language processing tools to process and/or analyze a user input (e.g., according to particular instructions of the SOE). For example, the natural language processing module may include speech-to-text tools, text-to-speech tools, and/or the like for processing the user input, determining intent or a purpose for the user communicating with the SOE and/or the user using the data management platform, identifying an operation that is to be performed in association with the data management platform, and/or the like. In some implementations, the natural language processing module may be hosted on a separate platform than the SOE. Additionally, or alternatively, the natural language processing module may be associated with an application of a virtual assistant platform and/or a data management platform, an online portal associated with the virtual assistant platform and/or data management platform, and/or the like.

In some implementations, the natural language processing module may parse natural language descriptions of a requested operation, an indicated account, an indicated user, an indicated data management platform, and/or the like. For example, the natural language processing module may obtain data identifying, in natural language, a description of an operation that is to be performed in association with an account and/or a data management platform, and may parse the data to identify the account, any information that is to be updated and/or provided by the operation, the data management platform, the user, and/or the like.

In some implementations, the natural language processing module may determine a characteristic of an operation, an account, a user, and/or a data management platform based on natural language processing of the user input, which may include a description of the operation, account, user, and/or data management platform. For example, based on a description of operation being "update my address for my Platform 1 account," the natural language processing module may use natural language processing to determine that a characteristic of the operation is that the operation is to include editing address information of the account of Platform 1. Similarly, based on a description of the user stating "add my newborn son to my Platform 2 account," the natural language processing module may use natural language processing to determine characteristics of the operation, such as the operation involves adding information (namely indicating that the user has a newborn son, providing the user's newborn son's name, and/or the like), the operation involves adding information to the user's account of Platform 2 (e.g., which may be an account that tracks a user's familial relationships (e.g., a health insurance account, a governmental account (e.g., for tax purposes, for census, and/or the like)), and/or the like. In this case, the natural language processing module may determine that a natural language user input corresponds to a characteristic based on data relating to other operations, data identifying characteristics of the operation, and/or the like.

In this way, the natural language processing module may identify characteristics associated with a user, an account, an operation, a data management platform, and/or the like, as described herein. Based on applying a rigorous and automated process associated with performing an operation associated with managing data for one or more data management platforms, the natural language processing module (and/or SOE) enables recognition and/or identification of thousands or millions of operations and/or data management platforms for thousands or millions of users and/or accounts associated with the data management platforms, thereby increasing an accuracy and consistency of managing data (e.g., updating data, editing data, adding data, removing data, and/or the like) associated with one or more data management platforms relative to requiring computing resources to be allocated for hundreds or thousands of technicians to manually manage data for the one or more data management platforms for the thousands or millions of users and/or accounts.

In some implementations, the SOE may address imperfections in the analyzed user input. For example, the SOE may invoke a geocoding API to find a geolocation and/or specific address (e.g., a known or registered address) corresponding to an indicated address in the user information (e.g., if the indicated address does not correspond to a known or a registered address of the API). In such cases, the natural language processing module may recognize that an address was provided in the user input (e.g., to update the address associated with an account of the user), but the provided address is not a known and/or registered address (or that the address is to be normalized). Accordingly, the natural language processing module may indicate to the SOE that an address is to be normalized and the SOE may utilize the geocoding API to obtain a known or related address to the address that was provided in the user input. In this way, the SOE may verify and/or correct information that is provided from the virtual assistant device (and/or from a user).

Additionally, or alternatively, the natural language processing module may be configured to request the user to correct information associated with the user input. For example, the natural language processing module (and/or SOE) may be configured to determine a level of accuracy associated with the information. The level of accuracy may correspond to a score as calculated according to any suitable natural language processing analysis and/or model, as described herein. In such cases, if the level of accuracy does not satisfy a threshold (e.g., a threshold associated with being able to discern the information, identify the information, and/or the like), the natural language processing may obtain new information associated with the user input (e.g., via a request from the user, via an API, and/or the like). Therefore, if the natural language processing module cannot analyze the user input appropriately enough to identify the user, the account, the operation, and/or the data management platform, the natural language processing module may be configured to request that the information be provided and/or that the information be provided in a more clear manner (e.g., via a message to the virtual assistant device that the user resubmit, enunciate, and/or reword the user input). In some implementations, as described herein, the natural language processing module may be configured to request additional information associated with an operation. For example, if the user indicates the user would like to update an address, the natural language processing module may cause the user service interface to respond to acknowledge the request and also request that the user provide the specific address. Accordingly, the natural language processing module may operate to verify a user input and/or request that an appropriate user input be provided that can be properly analyzed to permit the SOE to cause the operation to be performed (e.g., via an RPA).

In some implementations, the SOE may include user identification tools to identify the user that is providing the input. For example, the SOE may use a voice recognition analysis if the user input is associated with an audio signal. The SOE may use any suitable voice recognition technique (e.g., voice signature detection/lookup, and/or the like) to identify the user. In some implementations, based on identifying the user, the SOE may identify one or more accounts associated with the user and/or the data management platforms. For example, the SOE may maintain a mapping of users to accounts (or account identifiers) of the user for the data management platforms. In some implementations, other types of biometric analysis (e.g., facial recognition, fingerprint analysis, and/or the like) may be used to identify the user. For example, the SOE may obtain a fingerprint (to perform a fingerprint recognition analysis), an image of the user's face (e.g., to perform a facial recognition analysis), a retinal scan (e.g., to perform a retinal scan analysis), and/or the like to identify the user.

In this way, the SOE (e.g., via the natural language processing module) may determine a user, an account of the user, an operation that is to be performed, and/or a data management platform associated with the operation to permit the SOE to manage the data associated with the account of the data management platform and/or cause an operation to be performed in association with the account of the data management platform.

As further shown in FIG. 1, and by reference number 130, the SOE determines an operation that is to be performed in association with an account associated with one of the plurality of data management platforms. For example, based on the analysis of the user input performed by the natural language processing module, the SOE may identify the operation that is to be performed, the account associated with the operation (e.g., the account of the user), and the data management platform that is involved in the operation.

According to some implementations, the SOE may analyze the operation to determine which data management platform is associated with the operation (e.g., which data management platform is to be access to update and/or manage data associated with the data management platform). In such cases, the SOE may determine a type of the data management platform. For example, the type of the data management platform may be a data management platform that permits a backend service (e.g., an API made public by the data management platform) to be used to perform the operation. In such cases, the SOE may determine and/or confirm whether the backend service is up-to-date and/or operable to perform the operation. If the SOE determines that the backend service is operable to perform the operation, the SOE may determine that the operation is to be performed via the backend service, as described herein. On the other hand, if the SOE determines that the backend service is not operable to perform the operation, the SOE may determine that the operation is not to be performed via the backend service (and/or that the operation is to be performed via a frontend service, such as through a user interface associated with the data management platform).

In some implementations, performing an operation through a backend service, if the backend service is operable to perform the operation, may be more efficient and/or utilize less resources (e.g., less computing resources and/or network resources) than performing the operation through a frontend service. For example, an API may enable direct access to the data management platform, involving a communication link (e.g., a direct communication link) between the SOE and the data management platform and/or less processing of data associated with the data management platform by having the ability to manipulate the data via the API. On the other hand, using a frontend service may involve indirectly accessing the data of the data management platform through a user interface (e.g., of an application associated with the data management platform), which might involve several communications to log in to the account through the user interface, navigate the user interface, identify the elements of the user interface that may enable the operation to be performed, and performing the operation through the elements. However, if the backend service is inoperable and/or unavailable to the SOE, resources associated with attempting to perform the operation through the backend service, which would be futile, can be conserved by performing the operation through the frontend service, as described herein. In this way, the SOE may conserve computing resources and/or network resources associated with performing an operation through a backend service when the backend service is available (or operable) or performing the operation through a frontend service when the backend service is not available (or inoperable).

In some implementations, the SOE may use a machine learning model, such as an operation performance model, to determine whether the operation is to be performed on a data management platform via a backend service or via a frontend service. For example, the SOE may train the machine learning model based on one or more parameters associated with using a backend service or a frontend service to perform an operation, such as the type of data management platform, a characteristic of the operation, a characteristic of the account, whether an API associated with the data management platform is available, one or more characteristics (e.g., an issue date, a version, and/or the like) associated with the API, and/or the like. The SOE may train the machine learning model using historical data associated with determining whether an operation is to be performed on a data management platform using a backend service or frontend service according to the one or more parameters. Using the historical data and the one or more parameters as inputs to the machine learning model, SOE may select whether to use a backend service or a frontend service to perform the action so that the operation can be effectively performed.

In this way, the SOE may determine the operation that is to be performed and/or may determine whether the operation is to be performed via a backend service or a frontend service to permit the SOE to cause the operation to be performed on the data management platform (and/or the data of the data management platform).

As further shown in FIG. 1, and by reference number 140, the SOE causes the operation to be performed on the corresponding data management platform. As described herein, the SOE may cause the operation to be performed via a backend service or a frontend service. In some implementations, the SOE may perform the operation (e.g., using a user service interface, a natural language processing module, an API, and/or an RPA of the SOE).

In some implementations, the SOE cause an operation to be performed using a backend service. For example, the SOE may access an API associated with the data management platform involved in the operation. In such cases, to perform the backend service, the SOE may make an API call associated with the API to cause the API to access the data management platform through the backend (e.g., through a web-based interface) to perform the operation.

Additionally, or alternatively, the SOE may cause an operation to be performed the operation using a frontend service. For example, the SOE may utilize and/or cause an RPA to access a user input and/or application associated with the data management platform involved in the operation. More specifically, the SOE may instruct the RPA log in to the application (e.g., based on log in information requested and/or received from the user), navigate the user interface and/or application to identify elements of the user interface and/or application that may be manipulated to perform the operation.

In this way, the SOE may be configured to cause an operation to be performed involving a data management platform using a backend service, when the backend service is available and/or operable, or a frontend service, when the backend service is not available or is inoperable. Accordingly, when the backend service is available, the SOE may conserve computing resources and/or network resources that may otherwise have been wasted by going through the frontend of the data management platform. Furthermore, when the backend service is unavailable or inoperable, the SOE may conserve computing resources and/or network resources that may otherwise have been wasted attempting to perform the operation through the unavailable and/or inoperable backend service.

As indicated above, FIG. 1 is provided merely as an example. Other examples may differ from what is described with regard to FIG. 1. In some implementations, the user service interface and/or the natural language processing module of FIG. 1 may be integrated within the SOE. In other words, the SOE may be combined with the user service interface and/or natural language processing module.

Figure 2:
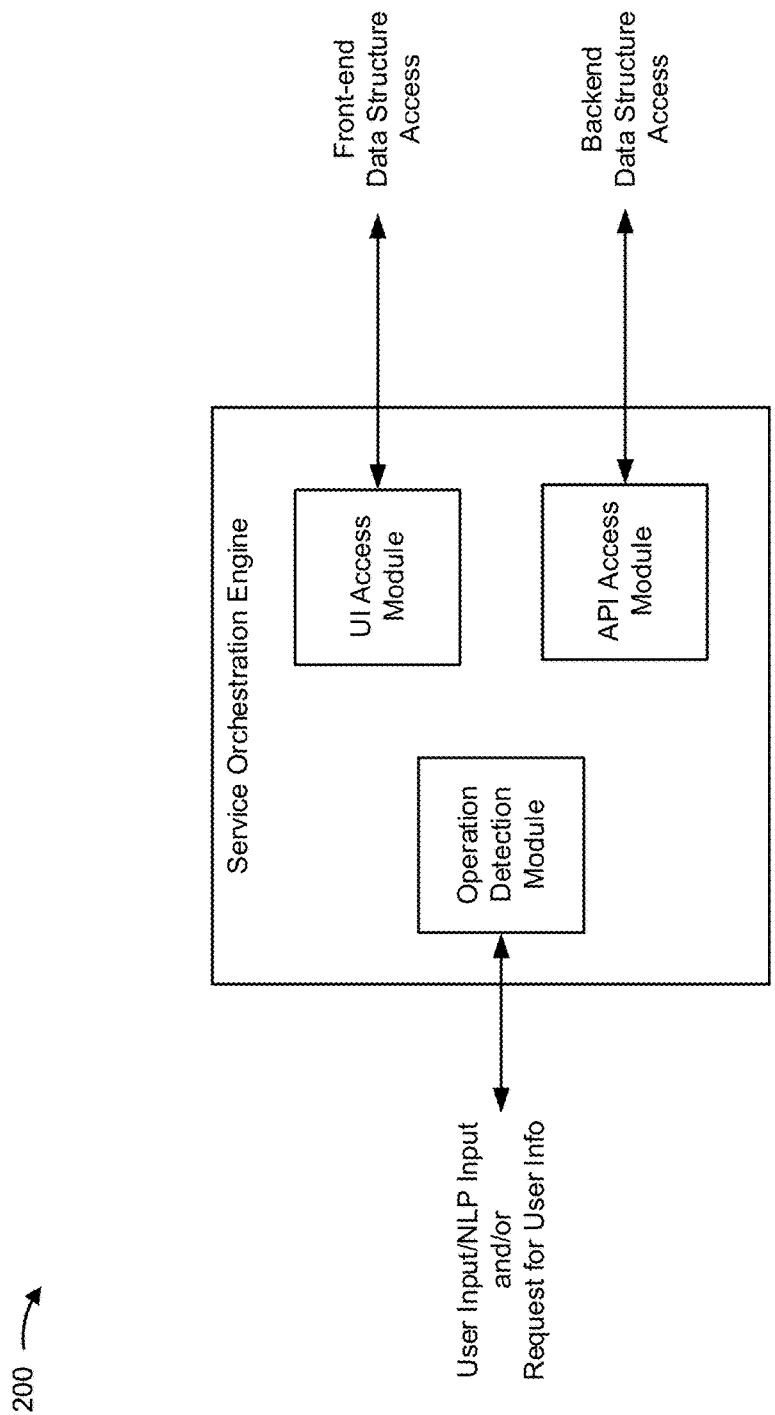
FIG. 2 is a diagram of an example implementation described herein.

FIG. 2 is a diagram of an example implementation 200 described herein. Example implementation 200 illustrates an example implementation of the SOE of example implementation 100 of FIG. 1. The SOE of FIG. 2 includes an operation detection module, a user interface access module (shown as "UI access module"), and an API access module.

The operation detection module may be configured to identify and/or determine an operation requested in a user input (e.g., a user input received from the virtual assistant device). In some implementations, identifying and/or determining the operation may include identifying and/or determining the user associated with the operation, the account associated with the operation, and/or the data management platform involved in the operation. In such cases, an operation that is to be performed on data in a first data management platform may involve different processes and/or steps than if the same operation were to be performed on data in a second data management platform. As described herein, an operation may include one or more of creating the account, editing user information (e.g., a name, an address, a relationship to the user (e.g., adding a child as a dependent for insurance or taxes, indicating a marital status and/or spouse, and/or the like), and/or the like) associated with the account, adding information to the account (e.g., payment information, subscription to a service, and/or the like), removing information from the account, removing an association to the account, adding a service (e.g., a service provided by the data management platform) associated with the account, linking the account to another data management platform that is different from the data management platform, and/or the like.

In some implementations, the SOE may use a machine learning model, such as an operation detection model, to identify an operation within a user input. For example, the SOE may train the operation detection model to identify an operation based on one or more parameters associated with identifying the operation, identifying one or more other operations in one or more other user inputs associated with the user, and/or identifying one or more other user inputs associated with one or more other users. Such parameters may include one or more keywords associated with an operation (e.g., "update," "edit," "remove," and/or the like), user inputs that have referenced the operation, the account involved in the operation, the data management platform involved in the operation, types of possible operations associated with an account or data management platform, and/or the like. The SOE may train the operation detection model to detect an operation using historical data associated with identifying the operation, identifying one or more other operations in one or more other user inputs associated with the user, and/or identifying one or more other user inputs associated with one or more other users. Using the historical data and the one or more parameters as inputs to the operation detection model, the SOE may identify the operation to permit the SOE to determine whether the operation can be performed using a backend service and/or a frontend service and, further, to permit the SOE to perform the operation.

The API access module of the SOE may be configured to use an API and/or one or more calls of an API to cause an operation to be performed (e.g., if such an API is available and/or operable) via a web-based service. The API access module may then cause the data to be manipulated in the data management platform using the API and/or one or more API calls. In some implementations, the API access module may be configured to determine whether an API is available for a particular operation. In some implementations, the API access module may use the operation performance described above to determine whether the API access module is to perform an operation and/or instruct the user interface access module to perform the operation.

The user interface access module may be configured to use a user interface (e.g., a user interface of an application) associated with the data management platform to perform an action (e.g., if a backend service is unavailable and/or inoperable). For example, the SOE may use an RPA that is capable of logging into an account of the user that is associated with the data management platform, identifying elements of the user interface that may be used to update and/or manage the account, and manipulate the elements of the user interface to perform the action. Accordingly, the SOE may cause an operation to be performed through the front end of the data management platform.

In some implementations, the SOE may include and/or receive information, associated with a user, from the user service interface and generate and/or process the information that is to be updated in a data structure associated with a data management platform according to an operation. In some implementations, the SOE may include or utilize an SOE data structure (e.g., a data structure within a cloud environment or cloud service) to temporarily store, sort, and/or organize information associated with one or more users and/or accounts associated with the one or more data management platforms. The SOE data structure may include a table, a database, a graph, and/or the like that corresponds to a user interface of the application. In some implementations, the SOE may utilize machine learning when generating the data structure and/or storing user information in the data structure. For example, the SOE may use a machine learning model to determine which information is to be stored, a duration associated with storing the information, and/or the like. Such a machine learning model may be trained based on historical data associated with the user providing the information, the user requesting one or more operations that involve the information, a user instruction to store the information and/or other information, and/or the like. Accordingly, the SOE may use the machine learning model to determine where information is to be stored and/or maintained within the SOE data structure.

In some implementations, based on the SOE obtaining relevant information (e.g., the user, the account, the operation, the data management platform, and/or the like associated with the user input) from the user service interface, the SOE may process and/or populate the information within the data structure. In such cases, the SOE may use an RPA or cause the RPA to utilize a backend service and/or a frontend service of the data management platform to add the user information from the SOE data structure to a data structure of the data management platform. For example, if a user provides information to update the user's address, the SOE data structure may include a field for a name and/or identifier (e.g., social security number, a serial number, an account number, a member number, and/or the like) of the user extracted from the user information and a field for an address of the user. The SOE may then utilize the data in the fields of the SOE data structure to cause corresponding information to be updated and/or maintained in the data management platforms. In some implementations, information (e.g., user information, account information, operation information, and/or the like) in the SOE data structure may be removed after a threshold time period relative to receiving the information, after an operation associated with the information is performed in association with one or more of the data management platforms, and/or the like.

In some implementations, the user interface access module may access a user interface of the application of the data management platform. The SOE using the information from the SOE data structure, may cause the RPA to navigate the user interface and enter appropriate information in appropriate fields of the user interface. Referring to the example above, the SOE may use an RPA to identify fields associated with indicating a user accessing the application. The RPA may be configured to enter a user name and/or identifier from the SOE data structure. As a more specific example, if the operation involves updating an address of the user for a particular data management platform, the SOE may cause the RPA to identify an "update address" user interface element of an application associated with the data management platform and cause the RPA to navigate to the "update address" user interface element to insert address information associated with the user from the SOE data structure and/or user input to effectively update the address of the user in the data management platform.

In some implementations, the SOE may use machine learning to cause the RPA to navigate a user interface and/or enter appropriate user information in appropriate fields of the user interface. For example, the SOE may use a machine learning model, such as a user interface navigation model, to identify one or more elements of the user interface that can be used to navigate the user interface. For example, the SOE may train the user interface navigation model based on one or more parameters associated with the user interface elements (e.g., the types of the user interface elements, the functions of the user interface elements, and/or the like), a type of the application, one or more characteristics of the data management platform, one or more characteristics of the operation, one or more characteristics of the account, and/or the like. The SOE may train the user interface navigation model using historical data associated with identifying one or more elements of the user interface that can be used to navigate the user interface and/or one or more other user interfaces according to the one or more parameters. Using the historical data and the one or more parameters as inputs to the user interface navigation model, the SOE may identify user interface elements that may be used to navigate a user interface to permit the SOE to cause an operation to be performed using the user interface.

In some implementations, the SOE and/or natural language processing module may determine that user assistance and/or additional information associated with navigating a user interface may be required to perform an operation. For example, the SOE and/or natural language processing module may detect (e.g., based on feedback from the RPA) that certain user interface elements may require additional user input (e.g., authorization information, more detailed information, corrected information, and/or the like) from the user. In such cases, the SOE may interact with the natural language processing to formulate responses to the user (e.g., that can be provided to the virtual assistant device) to permit the user to provide supplemental information associate with a previous user input. Accordingly, the SOE and/or data management platform may engage the user to assist with navigating the user interface and/or provide the desired information that may be required by the data management platform when performing the operation.

In some implementations, the SOE may use machine learning to determine additional information that is to be requested from the user to cause the RPA to navigate the user interface. For example, the SOE may use a machine learning model, such as a user assistance model, to identify one or more operations and/or user interface elements associated with an operation that may involve or require user assistance and/or additional user input (e.g., a password, corrected user information, and/or the like) to cause the RPA to navigate the user interface. For example, SOE may train the machine learning model based on one or more parameters associated with user interface elements that are associated with receiving certain types of information from the user (e.g., information that has not already been received by the SOE or is unknown to the SOE) and/or types of information that may be required to perform an operation, such as one or more characteristics of the user interface, one or more characteristics associated with one or more user interface elements of the user interface, one or more characteristics of the operation, one or more characteristics of the data management platform, one or more characteristics of an application associated with the user interface, and/or the like. The SOE may train the user assistance model, according to the one or more parameters, using historical data associated with identifying one or more operations and/or user interface elements associated with an operation that may involve or require user assistance and/or additional user input (e.g., a password, corrected user information, and/or the like) to cause the RPA to navigate the user interface. Using the historical data and the one or more parameters as inputs to the user assistance model, the SOE may identify one or more operations or user interface elements that may require user assistance and/or additional user input to cause the RPA to navigate a user interface to perform an operation associated with a data management platform.

In some implementations, the SOE enables automated updates to a data structure of a data management platform via an application. In such cases, the application may have access to a data structure of the data management platform to permit the SOE to perform the operation as described herein. In some implementations, the application may be hosted by a user device, may be hosted within a cloud environment (e.g., a cloud environment that hosts the SOE), may be accessible via an online portal, and/or the like. The user information may be automatically inserted into the data structure using an RPA to populate appropriate locations of the data structure based on the determined characteristics of the user information.

Accordingly, the SOE may utilize and/or include one or more modules that are configured to perform an operation, as described herein, via a backend service and/or a frontend service. In this way, based on whether a backend service is available, the SOE may conserve computing resources and/or network resources associated with performing an operation, as described herein. For example, relative to a user manually inputting the data through a frontend service, the SOE may conserve computing resources and/or network resources, by using a backend service of a data management platform if the backend service is operable and/or available to automatically and directly access the data of the data management platform. On the other hand, if the backend service is not available, the SOE may automatically perform the frontend service (e.g., without a user manually navigating a user interface), thus conserving computing resources and/or network resources that may have otherwise been wasted by a user manually attempting to navigate or navigating the user interface and/or by attempting to use an inoperable or unavailable backend service.

As indicated above, FIG. 2 is provided merely as an example. Other examples may differ from what is described with regard to FIG. 2.

Figure 3:
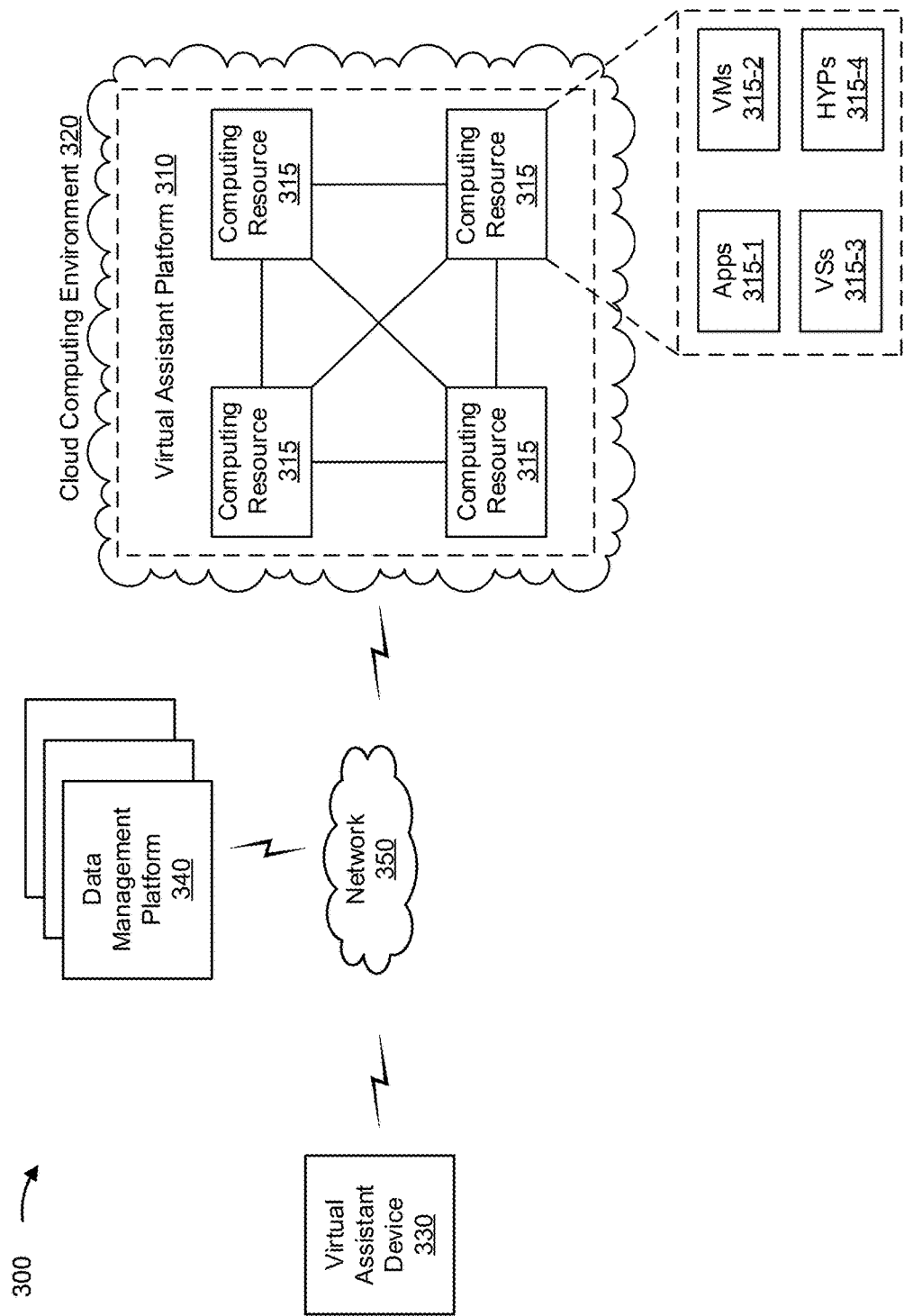
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an virtual assistant platform 310, a computing resource 315, a cloud computing environment 320, a virtual assistant device 330, one or more data management platforms 340 (referred to individually as "data management platform 340" and collectively as "data management platforms 340"), and a network 350. Devices of environment 300 may interconnect via wired connections, wireless connections, or a combination of wired and wireless connections.

virtual assistant platform 310 includes one or more computing resources assigned to provide artificial intelligence and robotic process automation for automated data management. For example, virtual assistant platform 310 may be a platform implemented by cloud computing environment 320 that may receive user input from a virtual assistant device, perform natural language processing on the user input, determine an operation to be performed in association with an account associated with one of a plurality of data management platforms, perform the operation on the corresponding data management platform and/or the like. In some implementations, virtual assistant platform 310 is implemented by computing resources 315 of cloud computing environment 320.

virtual assistant platform 310 may include a server device or a group of server devices. In some implementations, virtual assistant platform 310 may be hosted in cloud computing environment 320. Notably, while implementations described herein describe virtual assistant platform 310 as being hosted in cloud computing environment 320, in some implementations, virtual assistant platform 310 may be non-cloud-based or may be partially cloud-based.

Cloud computing environment 320 includes an environment that delivers computing as a service, whereby shared resources, services, etc. may be provided to virtual assistant device 330, data management platform 340, and/or the like. Cloud computing environment 320 may provide computation, software, data access, storage, and/or other services that do not require end-user knowledge of a physical location and configuration of a system and/or a device that delivers the services. As shown, cloud computing environment 320 may include virtual assistant platform 310 and computing resource 315

Computing resource 315 includes one or more personal computers, workstation computers, server devices, or another type of computation and/or communication device. In some implementations, computing resource 315 may host virtual assistant platform 310. The cloud resources may include compute instances executing in computing resource 315, storage devices provided in computing resource 315, data transfer devices provided by computing resource 315, etc. In some implementations, computing resource 315 may communicate with other computing resources 315 via wired connections, wireless connections, or a combination of wired and wireless connections.

As further shown in FIG. 3, computing resource 315 may include a group of cloud resources, such as one or more applications ("APPs") 315-1, one or more virtual machines ("VMs") 315-2, virtualized storage ("VSs") 315-3, one or more hypervisors ("HYPs") 315-4, or the like.

Application 315-1 includes one or more software applications that may be provided to or accessed by virtual assistant device 330. Application 315-1 may eliminate a need to install and execute the software applications on virtual assistant device 330. For example, application 315-1 may include software associated with virtual assistant platform 310 and/or any other software capable of being provided via cloud computing environment 320. In some implementations, one application 315-1 may send/receive information to/from one or more other applications 315-1, via virtual machine 315-2.

Virtual machine 315-2 includes a software implementation of a machine (e.g., a computer) that executes programs like a physical machine. Virtual machine 315-2 may be either a system virtual machine or a process virtual machine, depending upon use and degree of correspondence to any real machine by virtual machine 315-2. A system virtual machine may provide a complete system platform that supports execution of a complete operating system ("OS"). A process virtual machine may execute a single program and may support a single process. In some implementations, virtual machine 315-2 may execute on behalf of a user (e.g., virtual assistant device 330), and may manage infrastructure of cloud computing environment 320, such as data management, synchronization, or long-duration data transfers.

Virtualized storage 315-3 includes one or more storage systems and/or one or more devices that use virtualization techniques within the storage systems or devices of computing resource 315. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 315-4 provides hardware virtualization techniques that allow multiple operating systems (e.g., "guest operating systems") to execute concurrently on a host computer, such as computing resource 315. Hypervisor 315-4 may present a virtual operating platform to the guest operating systems and may manage the execution of the guest operating systems. Multiple instances of a variety of operating systems may share virtualized hardware resources.

Virtual assistant device 330 includes one or more devices capable of receiving, generating, storing, processing, and/or providing information associated with interacting with a user and communicating with virtual assistant platform 310. For example, virtual assistant device 330 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Data management platform 340 includes one or more devices capable of managing data stored in respective data structures. Data management platform 340 may include a server device (e.g., a host server, a web server, an application server, and/or the like), a data center device, or a similar device. In some implementations, data management platform 340 may manage information (e.g., information associated with an account of a user of virtual assistant device 330). In some implementations, the information may be updated (e.g., based on user input via virtual assistant device 330).

Network 350 includes one or more wired and/or wireless networks. For example, network 350 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
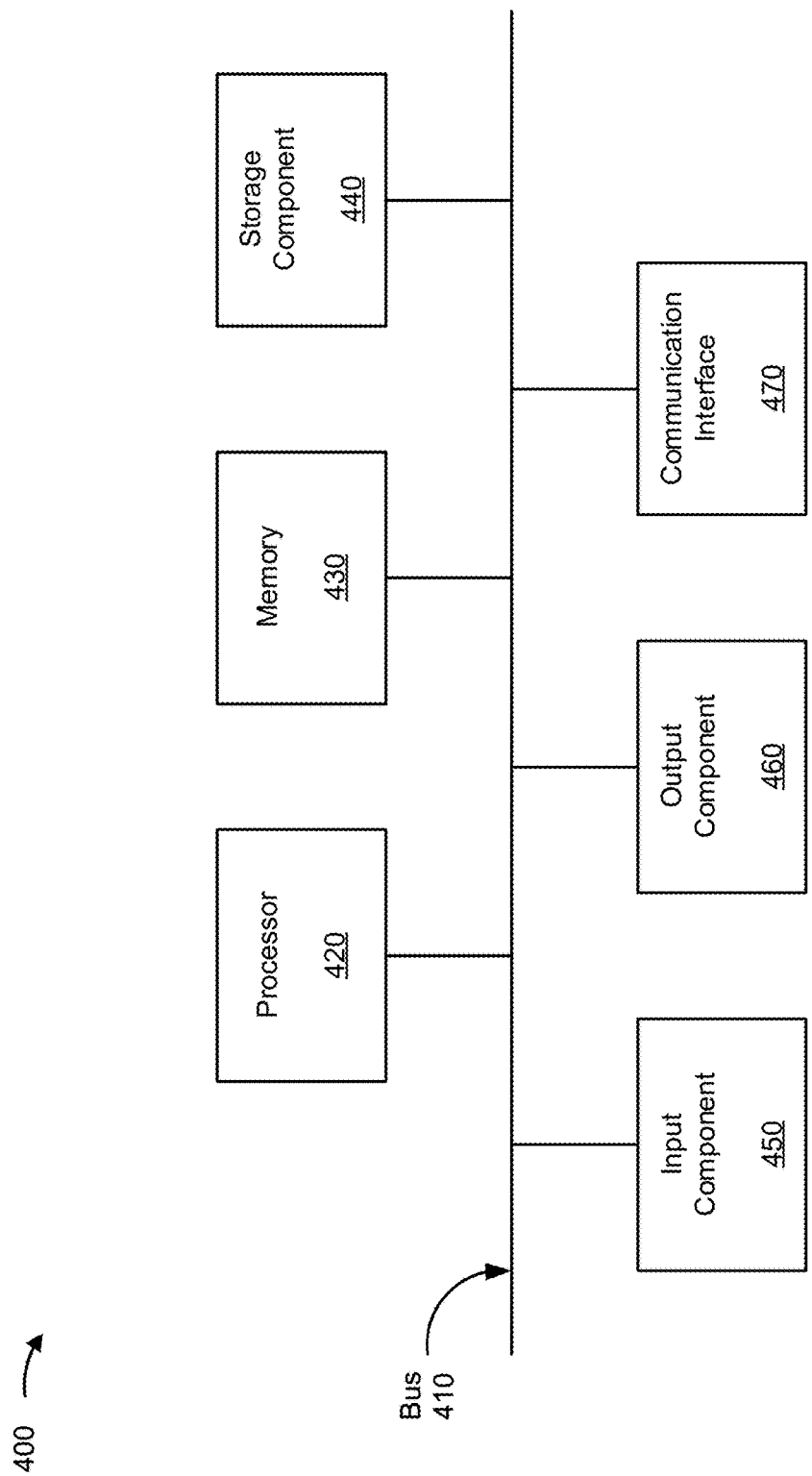
FIG. 4 is a diagram of example components of one or more devices of FIG. 3.

FIG. 4 is a diagram of example components of a device 400. Device 400 may correspond to virtual assistant platform 310, computing resource 315, virtual assistant device 330, and/or data management platform 340. In some implementations, virtual assistant platform 310, computing resource 315, virtual assistant device 330, and/or data management platform 340 may include one or more devices 400 and/or one or more components of device 400. As shown in FIG. 4, device 400 may include a bus 410, a processor 420, a memory 430, a storage component 440, an input component 450, an output component 460, and/or a communication interface 470.

Bus 410 includes a component that permits communication among multiple components of device 400. Processor 420 is implemented in hardware, firmware, and/or a combination of hardware and software. Processor 420 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 420 executing software instructions stored by a computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
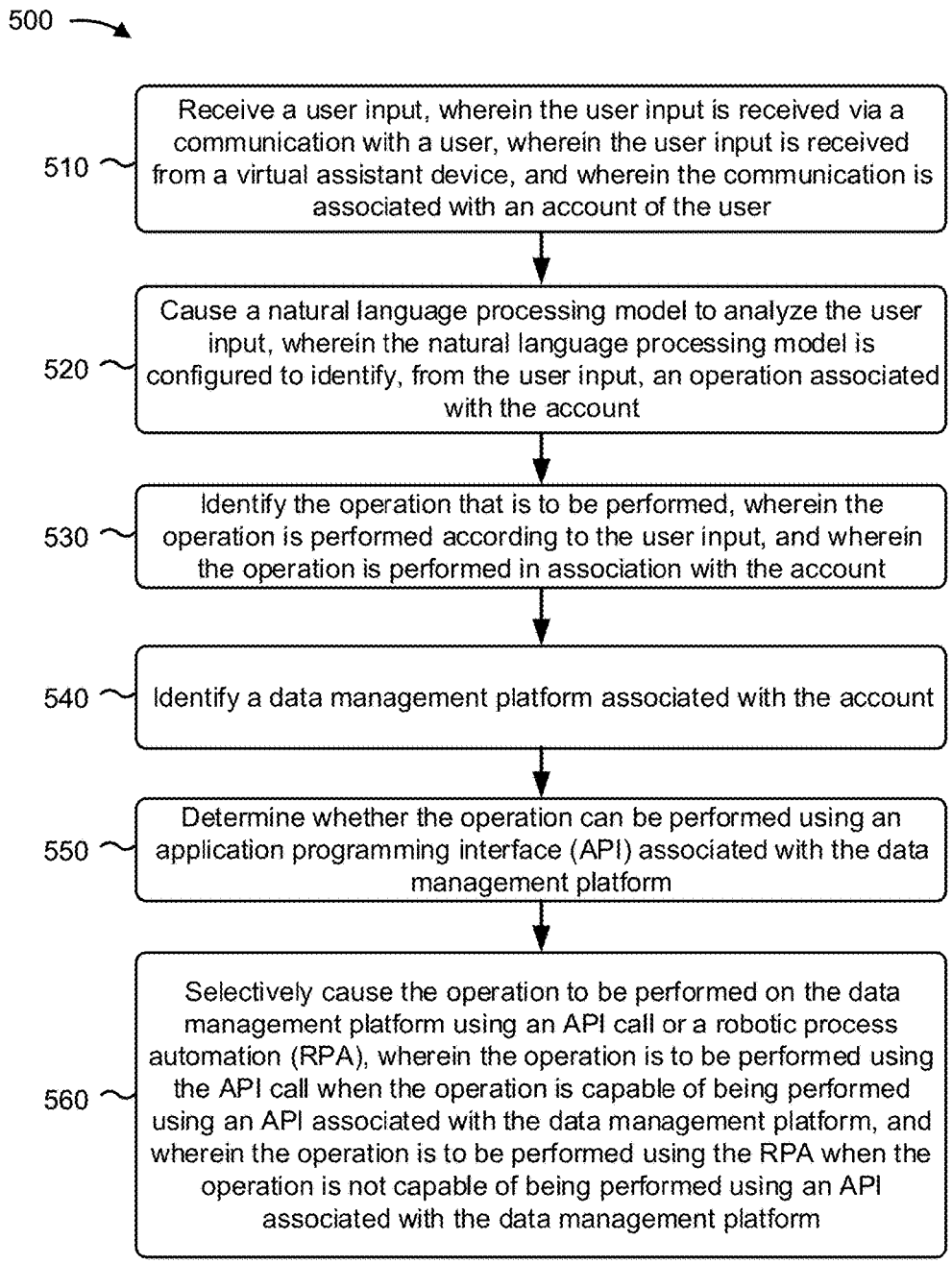
FIGS. 5-7 are flow charts of example processes associated with artificial intelligence and robotic process automation for automated data management.

FIG. 5 is a flow chart of an example process 500 associated with artificial intelligence and robotic process automation for automated data management. In some implementations, one or more process blocks of FIG. 5 may be performed by virtual assistant platform (e.g., virtual assistant platform 310). In some implementations, one or more process blocks of FIG. 5 may be performed by another device or a group of devices separate from or including the virtual assistant platform, such as a computing resource (e.g., computing resource 315), a virtual assistant device (e.g., virtual assistant device 330), and a data management platform (e.g., data management platform 340).

As shown in FIG. 5, process 500 may include receiving a user input, wherein the user input is received via a communication with a user, wherein the user input is received from a virtual assistant device, and wherein the communication is associated with an account of the user (block 510). For example, the virtual assistant platform (e.g., using computing resource 315, processor 420, memory 430, storage component 440, input component 450, communication interface 470, and/or the like) may receive a user input. In some implementations, the user input is received via a communication with a user. In some implementations, the user input is received from a virtual assistant device. In some implementations, the communication is associated with an account of the user.

As further shown in FIG. 5, process 500 may include causing a natural language processing model to analyze the user input, wherein the natural language processing model is configured to identify, from the user input, an operation associated with the account (block 520). For example, the virtual assistant platform (e.g., using computing resource 315, processor 420, memory 430, storage component 440, and/or the like) may cause a natural language processing model to analyze the user input, as described above. In some implementations, the natural language processing model is configured to identify, from the user input, an operation associated with the account.

As further shown in FIG. 5, process 500 may include identifying the operation that is to be performed, wherein the operation is performed according to the user input, and wherein the operation is performed in association with the account (block 530). For example, the virtual assistant platform (e.g., using computing resource 315, processor 420, memory 430, storage component 440, and/or the like) may identify the operation that is to be performed, as described above. In some implementations, the operation is performed according to the user input. In some implementations, the operation is performed in association with the account.

As further shown in FIG. 5, process 500 may include identifying a data management platform associated with the account (block 540). For example, the virtual assistant platform (e.g., using computing resource 315, processor 420, memory 430, storage component 440, and/or the like) may identify a data management platform associated with the account, as described above.

As further shown in FIG. 5, process 500 may include determining whether the operation can be performed using an application programming interface (API) associated with the data management platform (block 550). For example, the virtual assistant platform (e.g., using computing resource 315, processor 420, memory 430, storage component 440, and/or the like) may determine whether the operation can be performed using an application programming interface (API) associated with the data management platform, as described above.

As further shown in FIG. 5, process 500 may include selectively causing the operation to be performed on the data management platform using an API call or a robotic process automation (RPA), wherein the operation is to be performed using the API call when the operation is capable of being performed using an API associated with the data management platform, wherein the operation is to be performed using the RPA when the operation is not capable of being performed using an API associated with the data management platform (block 560). For example, the virtual assistant platform (e.g., using computing resource 315, processor 420, memory 430, storage component 440, input component 450, output component 460, communication interface 470, and/or the like) may selectively cause the operation to be performed on the data management platform using an API call or a robotic process automation (RPA), as described above. In some implementations, the operation is to be performed using the API call when the operation is capable of being performed using an API associated with the data management platform. In some implementations, the operation is to be performed using the RPA when the operation is not capable of being performed using an API associated with the data management platform.

Process 500 may include additional implementations, such as any single implementation or any combination of implementations described below and/or in connection with one or more other processes described elsewhere herein.

In some implementations, the virtual assistant platform may identify the account of the user based on the natural language processing model identifying the account, a voice recognition analysis of the user input, and/or information associated with the virtual assistant device.

In some implementations, the natural language processing model may include a machine learning model, where the machine learning model is trained based on historical data associated with receiving previous user inputs from the user, historical data associated with receiving previous user inputs from one or more other users, and/or one or more parameters associated with identifying, from the user input, the operation, information in the account that is to be updated according to the operation, the account, and/or the data management platform.

In some implementations, the operation may include creating the account, editing user information associated with the account, adding information to the account, removing information from the account, removing an association to the account, adding a service associated with the data management platform, and/or linking the account to another data management platform that is different from the data management platform.

In some implementations, the virtual assistant platform may identify, using the natural language processing model, information, in the user input, that is associated with the operation, where the natural language processing model indicates that the operation is to update the account with the information, may determine a level of accuracy associated with the information, may obtain new information based on the level of accuracy not satisfying a threshold, and may replace the information with the new information to permit the operation to be performed based on the new information.

In some implementations, the virtual assistant platform may determine that the operation is capable of being performed using an API when the virtual assistant device is associated with the data management platform. In some implementations, the virtual assistant platform may determine that the operation is not capable of being performed using an API when the virtual assistant device is not associated with the data management platform.

In some implementations, when causing the operation to be performed using the RPA, the virtual assistant platform may identify information in the user input that is to be used to update the account, may identify the user interface associated with the data management platform, may identify an element of the user interface that permits the account to be updated with the information according to the operation, and may cause the element to update the account by automatically entering the information via the user interface.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
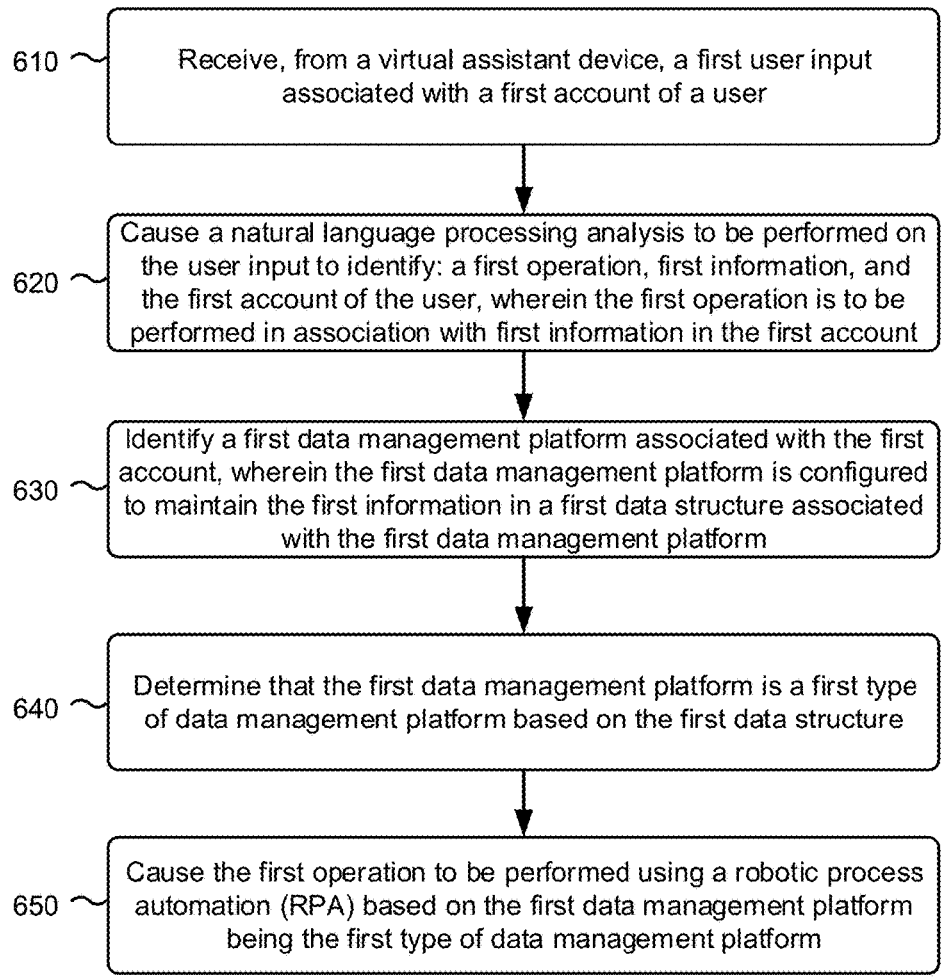

FIG. 6 is a flow chart of an example process 600 associated with artificial intelligence and robotic process automation for automated data management. In some implementations, one or more process blocks of FIG. 6 may be performed by an virtual assistant platform (e.g., virtual assistant platform 310). In some implementations, one or more process blocks of FIG. 6 may be performed by another device or a group of devices separate from or including the virtual assistant platform, such as a computing resource (e.g., computing resource 315), a virtual assistant device (e.g., virtual assistant device 330), and a data management platform (e.g., data management platform 340).

As further shown in FIG. 6, process 600 may include receiving, from a virtual assistant device, a first user input associated with a first account of a user (block 610). For example, the virtual assistant platform (e.g., using computing resource 315, processor 420, memory 430, storage component 440, input component 450, communication interface 470, and/or the like) may receive, from a virtual assistant device, a first user input associated with a first account of a user, as described above.

As further shown in FIG. 6, process 600 may include causing a natural language processing analysis to be performed on the user input to identify: a first operation, first information, and the first account of the user, wherein the first operation is to be performed in association with first information in the first account (block 620). For example, the virtual assistant platform (e.g., using computing resource 315, processor 420, memory 430, storage component 440, and/or the like) may cause a natural language processing analysis to be performed on the user input to identify: a first operation, first information, and the first account of the user, as described above. In some implementations, the first operation is to be performed in association with first information in the first account.

As further shown in FIG. 6, process 600 may include identifying a first data management platform associated with the first account, wherein the first data management platform is configured to maintain the first information in a first data structure associated with the first data management platform (block 630). For example, the virtual assistant platform (e.g., using computing resource 315, processor 420, memory 430, storage component 440, and/or the like) may identify a first data management platform associated with the first account, as described above. In some implementations, the first data management platform is configured to maintain the first information in a first data structure associated with the first data management platform.

As further shown in FIG. 6, process 600 may include determining that the first data management platform is a first type of data management platform based on the first data structure (block 640). For example, the virtual assistant platform (e.g., using computing resource 315, processor 420, memory 430, storage component 440, and/or the like) may determine that the first data management platform is a first type of data management platform based on the first data structure, as described above.

As shown in FIG. 6, process 600 may include causing the first operation to be performed using a robotic process automation (RPA) based on the first data management platform being the first type of data management platform (block 650). For example, the virtual assistant platform (e.g., using computing resource 315, processor 420, memory 430, storage component 440, input component 450, output component 460, communication interface 470, and/or the like) may cause the first operation to be performed using a robotic process automation (RPA) based on the first data management platform being the first type of data management platform, as described above.

Process 600 may include additional implementations, such as any single implementation or any combination of implementations described below and/or in connection with one or more other processes described elsewhere herein.

In some implementations, the virtual assistant platform may identify the first information that is to be used to update the first account, may identify the user interface associated with the first data management platform, may determine an element of the user interface that permits the first operation to be performed via the user interface, and may cause the element to update the data by automatically entering the first information via the user interface.

In some implementations, the natural language processing analysis may be a first natural language processing analysis. Additionally, the virtual assistant platform may determine that the first operation cannot be performed based on the first user input, may send, to the virtual assistant device, a request that the user provide additional information associated with the first operation, where the request is configured to cause the virtual assistant device to indicate that the user is to provide the additional information, may receive, from the virtual assistant, a second user input associated with the request, where the second user input includes second information associated with the first operation, may perform a second natural language processing analysis on the second user input to identify the second information associated with the first operation, and may cause the first operation to be performed using the RPA based on the second information.

In some implementations, the virtual assistant platform may determine that the first operation involves editing the first information in the first account, and, when causing the first operation to be performed using the RPA, the virtual assistant platform may identify an edit to the first information, may identify the user interface associated with the first data management platform, may identify an element associated with the user interface, where the element is configured to enable the edit to the first information to be made, and may cause the element to make the edit to the first information.

In some implementations, the virtual assistant platform may receive, from the virtual assistant device, a second user input associated with a second account of the user, may perform the natural language processing analysis on the second user input to identify a second operation, second information, and the second account of the user, where the second operation is to be performed in association with second information in the second account, may identify a second data management platform associated with the second account, where the second data management platform is configured to maintain the second information in a second data structure associated with the second data management platform, may determine that the second data management platform is a second type of data management platform based on the second data structure, where the second type of data management platform is different than the first type of data management platform, and may cause the second operation to be performed using an application programming interface (API) call based on the second data management platform being the second type of data management platform.

In some implementations, the first type of data management platform may include a type of data management platform that is not associated with an available application programming interface to perform the first operation in association with the first information in the first data structure.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
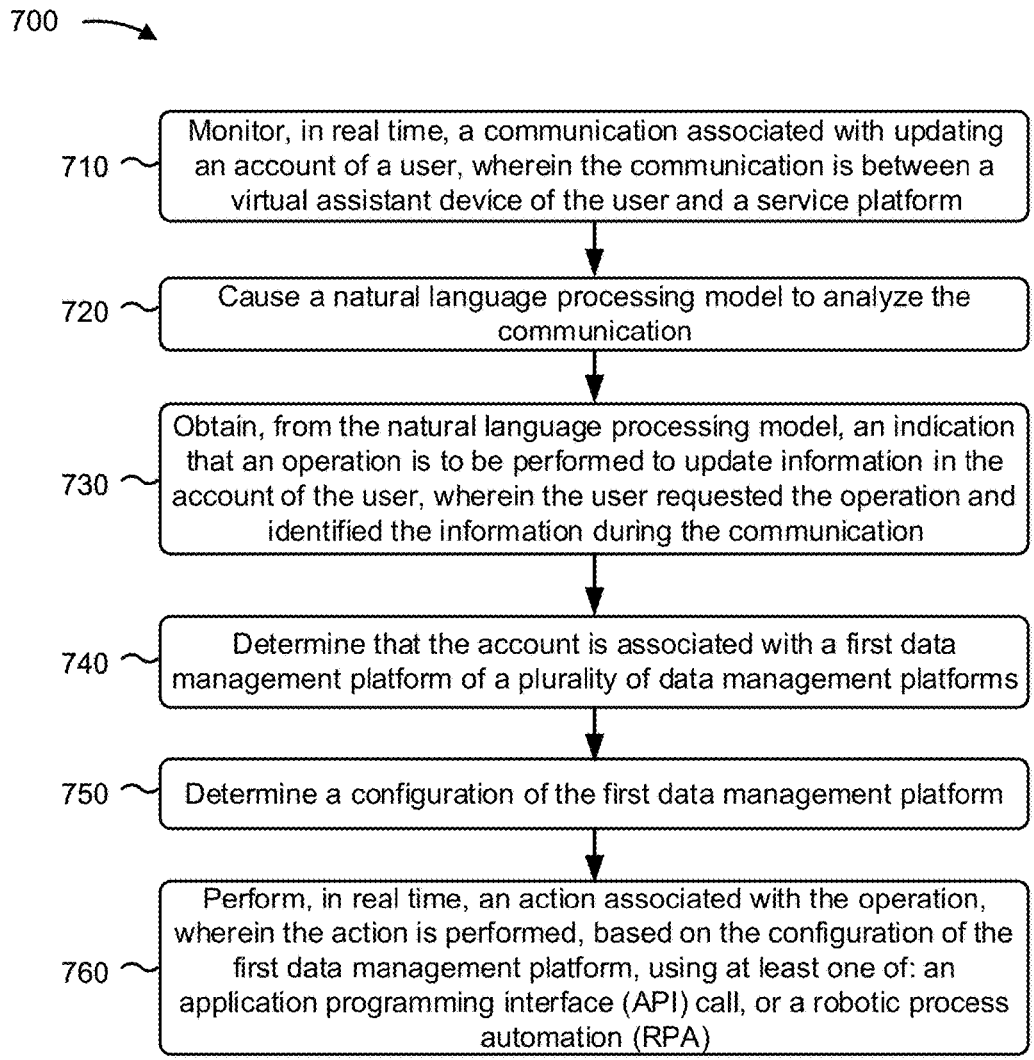

FIG. 7 is a flow chart of an example process 700 associated with artificial intelligence and robotic process automation for automated data management. In some implementations, one or more process blocks of FIG. 7 may be performed by a virtual assistant platform (e.g., virtual assistant platform 310). In some implementations, one or more process blocks of FIG. 7 may be performed by another device or a group of devices separate from or including the virtual assistant platform, such as a computing resource (e.g., computing resource 315), a virtual assistant device (e.g., virtual assistant device 330), and a data management platform (e.g., data management platform 340).

As shown in FIG. 7, process 700 may include monitoring, in real time, a communication associated with updating an account of a user, wherein the communication is between a virtual assistant device of the user and a service platform (block 710). For example, the virtual assistant platform (e.g., using computing resource 315, processor 420, memory 430, storage component 440, input component 450, output component 460, communication interface 470, and/or the like) may monitor, in real time, a communication associated with updating an account of a user, as described above. In some implementations, the communication is between a virtual assistant device of the user and a service platform.

As further shown in FIG. 7, process 700 may include causing a natural language processing model to analyze the communication (block 720). For example, the virtual assistant platform (e.g., using computing resource 315, processor 420, memory 430, storage component 440, and/or the like) may cause a natural language processing model to analyze the communication, as described above.

As shown in FIG. 7, process 700 may include obtaining, from the natural language processing model, an indication that an operation is to be performed to update information in the account of the user, wherein the user requested the operation and identified the information during the communication (block 730). For example, the virtual assistant platform (e.g., using computing resource 315, processor 420, memory 430, storage component 440, communication interface 470, and/or the like) may obtain, from the natural language processing model, an indication that an operation is to be performed to update information in the account of the user, as described above. In some implementations, the user requested the operation and identified the information during the communication.

As further shown in FIG. 7, process 700 may include determining that the account is associated with a first data management platform of a plurality of data management platforms (block 740). For example, the virtual assistant platform (e.g., using computing resource 315, processor 420, memory 430, storage component 440, and/or the like) may determine that the account is associated with a first data management platform of a plurality of data management platforms, as described above.

As further shown in FIG. 7, process 700 may include determining a configuration of the first data management platform (block 750). For example, the virtual assistant platform (e.g., using computing resource 315, processor 420, memory 430, storage component 440, and/or the like) may determine a configuration of the first data management platform, as described above.

As shown in FIG. 7, process 700 may include performing, in real time, an action associated with the operation, wherein the action is performed, based on the configuration of the first data management platform, using at least one of: an application programming interface (API) call, or a robotic process automation (RPA) (block 760). For example, the virtual assistant platform (e.g., using computing resource 315, processor 420, memory 430, storage component 440, input component 450, output component 460, communication interface 470, and/or the like) may perform, in real time, an action associated with the operation, as described above. In some implementations, the action is performed, based on the configuration of the first data management platform, using at least one of: an application programming interface (API) call, or a robotic process automation (RPA).

Process 700 may include additional implementations, such as any single implementation or any combination of implementations described below and/or in connection with one or more other processes described elsewhere herein.

In some implementations, the natural language processing model may include a machine learning model, where the machine learning model is trained based on historical data associated with previous communications involving the user, and/or based on one or more parameters that cause the machine learning model to identify, from the communication, the operation, information in the account that is to be updated according to the operation, the account, and/or the first data management platform.

In some implementations, the virtual assistant platform may determine a level of accuracy associated with the information, may obtain new information based on the level of accuracy satisfying a threshold, and may replace the information with the new information to permit the action associated with the operation to be performed based on the new information.

In some implementations, the virtual assistant platform may determine, based on the indication, that the user is to provide additional information to perform the operation, where the additional information is associated with the information, may cause, via the communication, the virtual assistant device to request that the user provide the additional information via the virtual assistant device, and may receive, via the communication and from the virtual assistant device, the additional information, where the action associated with the operation is performed based on the received additional information.

In some implementations, when performing the action, the virtual assistant platform may cause the operation to be performed using an application programming interface (API) call based on the configuration enabling the first data management platform to be accessed via an API. In some implementations, when performing the action, the virtual assistant platform may cause the operation to be performed using a robotic process automation (RPA) based on the configuration not enabling the first data management platform to be accessed via an application programming interface (API).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a user input,
      wherein the user input is received via a communication with a user,
      wherein the user input is received from a virtual assistant device, and
      wherein the communication is associated with an account of the user;
   causing, by the device, a natural language processing model to analyze the user input,
      wherein the natural language processing model is configured to identify, from the user input, an operation associated with the account;
   identifying, by the device, the operation that is to be performed,
      wherein the operation is performed according to the user input, and
      wherein the operation is performed in association with the account;
   identifying, by the device, a data management platform associated with the account;
   determining, by the device, whether the operation can be performed using an application programming interface (API) associated with the data management platform,
      wherein determining whether the operation can be performed using the API includes:
         determining whether the data management platform permits a backend service to be used to perform the operation; and
         determining whether the backend service is operable to perform the operation; and
   selectively causing, by the device, the operation to be performed on the data management platform using:
      an API call, or
      a robotic process automation (RPA) that uses a user interface associated with the data management platform,
         wherein the operation is to be performed using the API call when the operation is capable of being performed using the API associated with the data management platform, and
         wherein the operation is to be performed using the RPA when the operation is not capable of being performed using the API associated with the data management platform,
            wherein the operation is not capable of being performed using the API when one or more of:
               the backend service is outdated,
               the backend service is corrupted,
               the backend service is unavailable, or
               the device is incompatible with the data management platform.

2. The method of claim 1, further comprising:
   identifying the account of the user based on at least one of:
      the natural language processing model identifying the account,
      a voice recognition analysis of the user input, or
      information associated with the virtual assistant device.

3. The method of claim 1, wherein the natural language processing model comprises a machine learning model,
   wherein the machine learning model is trained based on at least one of:
      historical data associated with receiving previous user inputs from the user,
      historical data associated with receiving previous user inputs from one or more other users, or
      one or more parameters associated with identifying, from the user input, at least one of:
         the operation,
         information in the account that is to be updated according to the operation,
         the account, or
         the data management platform.

4. The method of claim 1, wherein the operation comprises at least one of:
   creating the account,
   editing user information associated with the account,
   adding information to the account,
   removing information from the account,
   removing an association to the account,
   adding a service associated with the data management platform, or
   linking the account to another data management platform that is different from the data management platform.

5. The method of claim 1, further comprising:
   identifying, using the natural language processing model, information, in the user input, that is associated with the operation,
      wherein the natural language processing model indicates that the operation is to update the account with the information;
   determining a level of accuracy associated with the information;
   obtaining new information based on the level of accuracy not satisfying a threshold; and
   replacing the information with the new information to permit the operation to be performed based on the new information.

6. The method of claim 1, further comprising:
   determining that the operation is capable of being performed using an API when the virtual assistant device is associated with the data management platform.

7. The method of claim 1, wherein causing the operation to be performed using the RPA comprises:
   identifying information in the user input that is to be used to update the account;
   identifying the user interface associated with the data management platform;
   identifying an element of the user interface that permits the account to be updated with the information according to the operation; and
   causing the element to update the account by automatically entering the information via the user interface.

8. The method of claim 1, wherein the virtual assistant device is associated with one or more of:
   a call center,
   a chat bot, or
   a voice gateway.

9. A device, comprising:
   one or more memories; and
   one or more processors, communicatively coupled to the one or more memories, to:

receive, from a virtual assistant device, a first user input associated with a first account of a user;
cause a natural language processing analysis to be performed on the first user input to identify:
a first operation,
first information, and
the first account of the user,
wherein the first operation is to be performed in association with the first information in the first account;
identify a first data management platform associated with the first account,
wherein the first data management platform is configured to maintain the first information in a first data structure associated with the first data management platform;
determine that the first data management platform is a first type of data management platform based on the first data structure,
wherein, when determining that the first data management platform is the first type of data management platform, the one or more processors are to:
determine that the first data management platform does not permit a backend service to be used to perform the first operation, and
determine that the backend service of the first data management platform is not capable of performing the first operation,
wherein the backend service is not capable of performing the first operation when one or more of:
the backend service is outdated,
the backend service is corrupted,
the backend service is unavailable, or
the device is incompatible with the first data management platform; and
cause the first operation to be performed using a robotic process automation (RPA) based on the first data management platform being the first type of data management platform,
wherein the RPA uses a user interface of the first data management platform.

10. The device of claim 9, wherein the one or more processors are further to:
identify the first information that is to be used to update the first account;
identify the user interface associated with the first data management platform;
determine an element of the user interface that permits the first operation to be performed via the user interface; and
cause the element to update data associated with the first data management platform, by automatically entering the first information via the user interface,
wherein the data is associated with the first data management platform.

11. The device of claim 9, wherein the natural language processing analysis is a first natural language processing analysis, and the one or more processors are further to:
determine that the first operation cannot be performed based on the first user input;
send, to the virtual assistant device, a request that the user provide additional information associated with the first operation,
wherein the request is configured to cause the virtual assistant device to indicate that the user is to provide the additional information;
receive, from the virtual assistant, a second user input associated with the request, wherein the second user input includes second information associated with the first operation;
perform a second natural language processing analysis on the second user input to identify the second information associated with the first operation; and
cause the first operation to be performed using the RPA based on the second information.

12. The device of claim 9, wherein the one or more processors are further to:
determine that the first operation involves editing the first information in the first account,
wherein the one or more processors, when causing the first operation to be performed using the RPA, are to:
identify an edit to the first information;
identify the user interface associated with the first data management platform;
identify an element associated with the user interface,
wherein the element is configured to enable the edit to the first information to be made; and
cause the element to make the edit to the first information.

13. The device of claim 9, wherein the one or more processors are further to:
receive, from the virtual assistant device, a second user input associated with a second account of the user;
perform the natural language processing analysis on the second user input to identify:
a second operation,
second information, and
the second account of the user,
wherein the second operation is to be performed in association with the second information in the second account;
identify a second data management platform associated with the second account,
wherein the second data management platform is configured to maintain the second information in a second data structure associated with the second data management platform;
determine that the second data management platform is a second type of data management platform based on the second data structure,
wherein the second type of data management platform is different than the first type of data management platform; and
cause the second operation to be performed using an application programming interface (API) call based on the second data management platform being the second type of data management platform.

14. The device of claim 9, wherein the virtual assistant device is associated with one or more of:
a call center,
a chat bot, or
a voice gateway.

15. A non-transitory computer-readable medium storing instructions, the instructions comprising:
one or more instructions that, when executed by one or more processors on a device, cause the one or more processors to:
monitor, in real time, a communication associated with updating an account of a user,
wherein the communication is between a virtual assistant device of the user and a service platform;

cause a natural language processing model to analyze the communication;

obtain, from the natural language processing model, an indication that an operation is to be performed to update information in the account of the user,
   wherein the user requested the operation and identified the information during the communication;

determine that the account is associated with a first data management platform of a plurality of data management platforms;

determine a configuration of the first data management platform,
   wherein the one or more instructions, that cause the one or more processors to determine the configuration of the first data management platform, cause the one or more processors to:
      determine whether the first data management platform permits a backend service to be used to perform the operation, and
      determine whether the backend service is operable to perform the operation; and perform, in real time, an action associated with the operation,
   wherein the action is performed, based on the configuration of the first data management platform, using at least one of:
      an application programming interface (API) call, or
      a robotic process automation (RPA) that uses a user interface of the first data management platform,
         wherein the action is performed using the RPA when the configuration does not enable the first data management platform to be accessed via the API call,
         wherein the configuration does not enable the first data management platform to be accessed via the API call when one or more of:
            the backend service is outdated,
            the backend service is corrupted,
            the backend service is unavailable, or
            the device is incompatible with the first data management platform.

16. The non-transitory computer-readable medium of claim 15, wherein the natural language processing model comprises a machine learning model,
   wherein the machine learning model is trained based on at least one of:
      historical data associated with previous communications involving the user, and
      one or more parameters that cause the machine learning model to identify, from the communication, at least one of:
         the operation,
         information in the account that is to be updated according to the operation,
         the account, or
         the first data management platform.

17. The non-transitory computer-readable medium of claim 15, wherein the one or more instructions, when executed by the one or more processors, further cause the one or more processors to:
   determine a level of accuracy associated with the information;
   obtain new information based on the level of accuracy not satisfying a threshold; and
   replace the information with the new information to permit the action associated with the operation to be performed based on the new information.

18. The non-transitory computer-readable medium of claim 15, wherein the one or more instructions, when executed by the one or more processors, further cause the one or more processors to:
   determine, based on the indication, that the user is to provide additional information to perform the operation,
      wherein the additional information is associated with the information;
   cause, via the communication, the virtual assistant device to request that the user provide the additional information via the virtual assistant device; and
   receive, via the communication and from the virtual assistant device, the additional information,
      wherein the action associated with the operation is performed based on the received additional information.

19. The non-transitory computer-readable medium of claim 15, wherein the one or more instructions, that cause the one or more processors to perform the action, cause the one or more processors to:
   cause the operation to be performed using the API call based on the configuration enabling the first data management platform to be accessed via the API.

20. The non-transitory computer-readable medium of claim 15, wherein the virtual assistant device is associated with one or more of:
   a call center,
   a chat bot, or
   a voice gateway.

* * * * *